US011644414B2

(12) United States Patent
Ahn et al.

(10) Patent No.: US 11,644,414 B2
(45) Date of Patent: May 9, 2023

(54) CHEMICAL SENSOR FOR DETECTING SULFIDE, HYDROGEN SULFIDE DETECTION KIT INCLUDING SAME, AND METHOD FOR PREPARING SAME

(71) Applicant: REPUBLIC OF KOREA(NATIONAL FORENSIC SERVICE DIRECTOR MINISTRY OF INTERIOR, Gangwon-do (KR)

(72) Inventors: Dae-Jun Ahn, Jeju-do (KR); Mia Kwon, Busan (KR); Jisook Min, Seoul (KR); Joon-Bae Lee, Gangwon-do (KR); Dong-Kye Lee, Busan (KR); Byeong-Yeol Song, Gangwon-do (KR)

(73) Assignee: REPUBLIC OF KOREA (NATIONAL FORENSIC SERVICE DIRECTOR MINISTRY OF INTERIOR AND SAFETY), Gangwon-Do (KR)

( * ) Notice: Subject to any disclaimer, the term of this patent is extended or adjusted under 35 U.S.C. 154(b) by 204 days.

(21) Appl. No.: 17/189,942

(22) Filed: Mar. 2, 2021

(65) Prior Publication Data

US 2021/0333199 A1   Oct. 28, 2021

(30) Foreign Application Priority Data

Apr. 28, 2020 (KR) .......... 10-2020-0051884
Jul. 1, 2020 (KR) .......... 10-2020-0080672

(51) Int. Cl.
*G01N 21/29* (2006.01)
*C07F 17/02* (2006.01)
*G01N 21/78* (2006.01)

(52) U.S. Cl.
CPC .......... *G01N 21/29* (2013.01); *C07F 17/02* (2013.01); *G01N 21/783* (2013.01)

(58) Field of Classification Search
CPC ............................ B01J 2231/342
See application file for complete search history.

(56) References Cited

U.S. PATENT DOCUMENTS 9,448,212 B2 * 9/2016 Fallis ............... C07D 417/04

FOREIGN PATENT DOCUMENTS

KR  1020160011047   1/2016
KR  10-1715476      3/2017
(Continued)

OTHER PUBLICATIONS

Vinod Kumar et al., Highly selective and sensitive chromogenic detection of nerve agents (sarin, tabun and VX): a multianalyte detection approach, 2017, Chem. Commun., 53, 12954 (Year: 2017).*

Kumar, V., et al., "Highly selective and sensitive chromogenic detection of nerve agents (sarin, tabun and VX)_a multianalyte detection approach," Chem. Commun., 2017, 53, 12954-12957.

(Continued)

*Primary Examiner* — Jennifer Wecker
*Assistant Examiner* — Mickey Huang
(74) *Attorney, Agent, or Firm* — Duane Morrs LLP; Gregory M. Lefkowitz

(57) ABSTRACT

The present disclosure relates to a ferrocene-based compound having high selectivity for sulfide ion. The ferrocene-based compound is obtained by reacting a ferrocene starting material with one or more organic compound selected from a nitrile, a methyl ester and an ethyl ester, and a chemical sensor in solution state is prepared by mixing the compound with an organic solvent. The chemical sensor according to the present disclosure has high selectivity and sensitivity for sulfide ion even at low concentration and may be used as a chemical sensor for detecting hydrogen sulfide in solution state by allowing visual inspection of sulfide ion. In addition, the present disclosure provides a hydrogen sulfide detection kit including an airtight container including an opening/closing door and a detection material inlet, a detec- (Continued)

tion unit which is provided inside the airtight container and composed of paper or fabric to which a ferrocene compound is adsorbed, and a basic reagent which is stored inside or outside the airtight container and generates sulfide ion from hydrogen sulfide. According to the present disclosure, hydrogen sulfide can be detected in real time by generating sulfide ion from hydrogen sulfide in gas or liquid state and visually inspecting the color change of the ferrocene compound of the detection kit.

9 Claims, 12 Drawing Sheets
(9 of 12 Drawing Sheet(s) Filed in Color)

(56) References Cited

FOREIGN PATENT DOCUMENTS

| | | |
|---|---|---|
| KR | 101722998 | 4/2017 |
| KR | 10-1792363 | 10/2017 |
| KR | 1020170114192 | 10/2017 |
| KR | 10-1898584 | 9/2018 |

OTHER PUBLICATIONS

Sola, A., et al., "The ferrocene-pyrylium dyad as a selective colorimetric chemodosimeter for the toxic cyanide and hydrogen sulfide anions in water," Org. Biomol. Chem., 2014, 12, 2547-2551.
Robinson, K.L., et al., "A Vinylanthracene and Vinylferrocene-Containing Copolymer: A New Dual pH/Sulfide Sensor," Electroanalysis 18, 2006, No. 7, 677-683.

* cited by examiner

ⓐ   ⓑ   ⓒ   ⓓ   ⓔ   ⓕ

CHEMICAL SENSOR FOR DETECTING SULFIDE, HYDROGEN SULFIDE DETECTION KIT INCLUDING SAME, AND METHOD FOR PREPARING SAME

CROSS-REFERENCE TO RELATED APPLICATIONS

This application claims priority under 35 U.S.C. § 119 to Korean Patent Application Nos. 10-2020-0051884 and 10-2020-0080672 filed on Apr. 28, 2020 and Jul. 1, 2020 respectively in the Korean Intellectual Property Office, the disclosure of which is incorporated herein by reference in its entirety.

TECHNICAL FIELD

The present disclosure relates to a ferrocene-based compound having high selectivity and superior sensitivity for a specific anion, and presents a ferrocene compound chemical sensor having high selectivity for sulfide ion and a method for preparing the same.

In addition, the present disclosure presents a new detection kit which includes a ferrocene-based compound having high selectivity and superior sensitivity for sulfide ion and allows fast detection for not only hydrogen sulfide gas but also hydrogen sulfide solution.

BACKGROUND ART

Efforts to quickly analyze harmful gases and harmful chemicals in industrial and living environments or accident sites are being made actively.

In particular, hydrogen sulfide ($H_2S$) is a colorless, poisonous gas with the characteristic foul odor of rotten eggs, produced commonly from breakdown of organic matter during oil refining, chemical preparation, wastewater and waste processing, etc. It is introduced into the body mainly via the respiratory organs. It may cause severe irritation to the mucous membrane and may cause lung damage if inhaled at high concentrations. Especially, exposure to high-concentration hydrogen sulfide often causes sudden death due to gas poisoning because of the paralysis of olfactory nerve. The fatally poisonous gas, hydrogen sulfide, is produced from sulfide ion ($S^{2-}$) under acidic conditions.

Currently available methods for selective detection of sulfide ion include ion-selective electrode, potentiometry, spectrometry, ion chromatography, etc. Most of these sulfide ion detection methods have the problems that detection in the presence of various interfering ions is very difficult, expensive and complicated devices are necessary, and a lot of time and cost are required for analysis.

For detection of harmful gaseous substances such as hydrogen sulfide, etc. on site, a process of collecting, detecting and identifying gas is necessary. With the existing sensor, gas detection is difficult due to frequent breakdown. In addition, since hydrogen sulfide dissolved in water is not detected, an expensive equipment is necessary for detection of the wastewater and the complicated process of pretreatment, target contrast, etc. is required. Therefore, fast detection of harmful substance at the scene of the accident is impossible.

Various sulfide-related detection technologies are known. For example, Korean Patent Registration No. 10-1715476 has presented a method of improving selectivity and sensitivity for hydrogen sulfide by preparing a sensing layer which senses hydrogen sulfide uniformly on a large area. Specifically, the hydrogen sulfide sensing layer is prepared by a step of conducting a sputtering process using a copper target at 300-700° C. under a partial pressure ratio of argon gas and oxygen gas which is greater than 95:5 and 97:3 or smaller. A hydrogen sulfide sensor includes a sensing layer which is formed on a base substrate and includes a randomly arranged cuprous oxide ($Cu_2O$)-copper (Cu) complex in rod or tree form, and two electrodes disposed on the sensing layer being spaced apart from each other. This technology is disadvantageous in that expensive equipment is necessary for the preparation, the preparation cost is high, sensitivity changes a lot depending on temperature, and fast detection of sulfide ion at the scene of the accident is difficult due to very slow response to hydrogen sulfide of about 5 minutes.

And, Korean Patent Registration No. 10-1898584 has proposed a sensor for detecting gaseous hydrogen sulfide at 0.5 ppm or higher, which includes: a substrate; a monolayer graphene sheet formed on the substrate; and metal nanoparticles formed on the graphene sheet, wherein the metal nanoparticles are a mixture of nanoparticles including 4.76 wt % of iron nanoparticles and 95.24 wt % of silver nanoparticle. Although this technology allows the detection of spill of hydrogen sulfide at landfill sites or biogas production sites at room temperature, the preparation cost is high due to the use of the graphene sheet, metal nanoparticles, etc. and detection of hydrogen sulfide in aqueous solutions is difficult.

When considering the level of the prior art, development of a new chemical sensor capable of monitoring sulfide ion which is the source of the fatal hydrogen sulfide at the accident site in real time is necessary. Especially, a chemical sensor which has high selectivity and sensitivity for sulfide ion in solution state, is easy to prepare and allows easy detection of sulfide ion through visual inspection is required.

As mentioned above, hydrogen sulfide ($H_2S$) is a colorless, poisonous gas with the characteristic foul odor of rotten eggs, produced commonly from breakdown of organic matter during oil refining, chemical preparation, wastewater and waste processing, etc. It is introduced into the body mainly via the respiratory organs. It may cause severe irritation to the mucous membrane and may cause lung damage if inhaled at high concentrations. Especially, exposure to high-concentration hydrogen sulfide often causes sudden death due to gas poisoning because of the paralysis of olfactory nerve. The fatally poisonous gas, hydrogen sulfide, is produced from sulfide ion ($S^{2-}$) under acidic conditions.

For detection of harmful gaseous substances such as hydrogen sulfide, etc. on site, a process of collecting, detecting and identifying gas is necessary. With the existing sensor, gas detection is difficult due to frequent breakdown. In addition, since hydrogen sulfide dissolved in water is not detected, an expensive equipment is necessary for detection of the wastewater and the complicated process of pretreatment, target contrast, etc. is required. Therefore, fast detection of harmful substance at the scene of the accident is impossible. For example, FIG. 6 shows existing apparatuses for gas analysis and sulfide ion identification. The portable gas collecting apparatus has the problem that long time is required for gas collection and inflow of liquid may cause breakdown. The portable gas detector has the problem that sensor breakdown may occur when analyzing high-concentration hydrogen sulfide, the device is expensive and analysis of sulfide ion and hydrogen sulfide in solution state is impossible. And, the apparatus for sulfide ion identification has the problem that the analysis process such as pretreatment, target contrast, etc. for identification is complicated, it takes at least 7 days until the identification result is obtained, maintenance cost is high because the apparatus is expensive, and only the analysis of sulfide ion in liquid state is possible.

Meanwhile, various hydrogen sulfide detection technologies are known. For example, Korean Patent Registration No. 10-1792363 proposes a color-changing lead(II) acetate/polymer complex nanofiber sensor wherein lead(II) acetate ($Pb(CH_3COO)_2$) powder, which is a dye material undergoing color transition to brown color by reacting with hydrogen sulfide gas, is uniformly attached inside and outside a 1D polymer nanofiber. According to this technology, dye powder is pulverized into nanometer to submicrometer size through a high-energy ball milling process and the fine dye powder is prepared into an electrospinning solution by mixing with a polymer in a solvent. The dye powder is attached to the polymer nanofiber obtained through electrospinning. This method has the problem that the preparation process is complicated, the preparation cost is high and the heavy metal lead is used.

In addition, Korean Patent Registration No. 10-1715476 has proposed a method of improving selectivity and sensitivity for hydrogen sulfide by uniformly forming a hydrogen sulfide-sensing layer on a large area. Specifically, the hydrogen sulfide-sensing layer is prepared by a step of conducting a sputtering process using a copper target at 300-700° C. under a partial pressure ratio of argon gas and oxygen gas which is greater than 95:5 and 97:3 or smaller. A hydrogen sulfide sensor includes a sensing layer which is formed on a base substrate and includes a randomly arranged cuprous oxide ($Cu_2O$)-copper (Cu) complex in rod or tree form, and two electrodes disposed on the sensing layer being spaced apart from each other. This technology is disadvantageous in that expensive equipment is necessary for the preparation, the preparation cost is high, sensitivity changes a lot depending on temperature, and fast detection of sulfide ion at the scene of the accident is difficult due to very slow response to hydrogen sulfide of about 5 minutes.

In addition, Korean Patent Registration No. 10-1898584 has proposed a sensor for detecting gaseous hydrogen sulfide at 0.5 ppm or higher, which includes: a substrate; a monolayer graphene sheet formed on the substrate; and metal nanoparticles formed on the graphene sheet, wherein the metal nanoparticles are a mixture of nanoparticles including 4.76 wt % of iron nanoparticles and 95.24 wt % of silver nanoparticle. Although this technology allows the detection of spill of hydrogen sulfide at landfill sites or biogas production sites at room temperature, the preparation cost is high due to the use of the graphene sheet, metal nanoparticles, etc. and detection of hydrogen sulfide in aqueous solutions is difficult.

For real-time monitoring of hydrogen sulfide at accident site, a detection kit with high sensitivity and fast responsivity is necessary. In particular, the development of a detection kit which has superior stability and can be prepared easily is required.

DISCLOSURE

Technical Problem

The present disclosure is directed to providing a chemical sensor which allows fast visual detection of sulfide ion, which is a source of hydrogen sulfide, in real time.

The present disclosure is also directed to providing a reliable detection result even for low-concentration sulfide ion in solution state through simple operation.

The present disclosure is also directed to providing a sulfide ion-selective chemical sensor which can be prepared economically, has excellent stability and can be used easily on site.

The present disclosure is also directed to providing a kit which allows fast visual detection of hydrogen sulfide in real time.

The present disclosure is also directed to providing a kit which can be prepared economically and allows detection of not only hydrogen sulfide gas but also hydrogen sulfide solution with high sensitivity.

The present disclosure is also directed to providing a hydrogen sulfide detection kit which has high stability for use and storage and can be easily used on site.

Other purposes and technical features of the present disclosure will be more described specifically hereinafter.

Technical Solution

The present disclosure provides a sulfide ion-selective chemical sensor including a ferrocene-based compound represented by Chemical Formula 1 and showing color change by selectively reacting with sulfide ion.

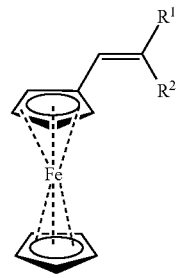

[Chemical Formula 1]

In Chemical Formula 1, each of $R^1$ and $R^2$ is independently an organic compound selected from nitrile (CN), methyl ester ($CO_2Me$) and ethyl ester ($CO_2Et$) and, $R^1$ and $R^2$ may be identical to or different from each other.

In the present disclosure, the chemical sensor may be a chemical sensor in solution state wherein 0.001-1.00% (w/v) of the compound represented by Chemical Formula 1 may be dissolved in one or more organic solvent selected from saturated or unsaturated hydrocarbons, ethers, esters, alcohols, amines and ketones, and may be used easily at accident site, etc.

The present disclosure also provides a method for preparing a sulfide ion-selective chemical sensor, which includes: a step of conducting reaction by mixing a ferrocene starting material with one or more organic compound selected from nitrile (CN), methyl ester ($CO_2Me$) and ethyl ester ($CO_2Et$) at an equimolar ratio in a solvent; a step of obtaining a ferrocene-based compound of Chemical Formula 1 by filtering a solid product produced from the reaction and removing the solvent under reduced pressure: and a step of dissolving the compound represented by Chemical Formula 1 0.001-1.00% (w/v) in one or more organic solvent selected from saturated or unsaturated hydrocarbons, ethers, esters, alcohols, amines and ketones.

The present disclosure also provides a hydrogen sulfide detection kit including: an airtight container including an opening/closing door and a detection material inlet; a detection unit which is provided inside the airtight container and composed of paper or fabric to which a ferrocene compound is adsorbed; and a basic reagent which is stored inside or outside the airtight container and generates sulfide ion from hydrogen sulfide, wherein the ferrocene compound is represented by Chemical Formula 1.

In the present disclosure, the basic reagent which generates sulfide ion by reacting with hydrogen sulfide may be any one selected from LiOH, NaOH, KOH, $Mg(OH)_2$, $Ca(OH)_2$, trimethylamine, triethylamine, pyridine and piperidine.

The present disclosure also provides a method for detecting hydrogen sulfide using a hydrogen sulfide detection kit including an airtight container including an opening/closing door and a detection material inlet, a detection unit which is provided inside the airtight container and composed of paper or fabric to which a ferrocene compound is adsorbed, and a basic reagent which is stored inside or outside the airtight container and generates sulfide ion from hydrogen sulfide, wherein the basic reagent is coated or introduced into the detection unit, a part of the detection unit is drawn out of the airtight container by partially opening the airtight container and then is exposed to hydrogen sulfide solution or hydrogen sulfide gas, or hydrogen sulfide solution or hydrogen sulfide gas is introduced into the inlet, and the presence of hydrogen sulfide is judged by the color change of the detection unit from violet to yellow.

Advantageous Effects

According to the present disclosure, a chemical sensor may be prepared economically by synthesizing a ferrocene-based compound via a simple method of reacting a commercially widely used starting material and diluting the same in an organic solvent.

In addition, the present disclosure allows visual inspection of the presence of sulfide ion, which is the source of hydrogen sulfide, in an unknown solution to be analyzed through color change in real time on site.

Since the chemical sensor of the present disclosure is capable of detecting sulfide ion in short time within several seconds and with high sensitivity, it can be used in various applications. Particularly, it can prevent the diffusion of hydrogen sulfide at an early stage on the site where spill accident has occurred by detecting sulfide ion at low concentration or high concentration in short time.

In addition, according to the present disclosure, hydrogen sulfide can be detected simply by visually monitoring the color change of the ferrocene-based compound, without requiring the complicated pretreatment of a sample containing sulfide ion, special chemical reaction conditions, expensive analytical instruments, etc.

In particular, due to excellent stability in use and superior hydrogen sulfide detection accuracy and sensitivity, detection can be made in short time with high sensitivity without being affected by environmental factors such as temperature and humidity.

In addition, not only gaseous hydrogen sulfide but also hydrogen sulfide in solution state can be detected, and the chemical sensor can be effectively utilized by detection specialists or police officers at accident sites.

BRIEF DESCRIPTION OF DRAWINGS

The patent or application file contains at least one drawing executed in color. Copies of this patent or patent application publication with color drawing(s) will be provided by the Office upon request and payment of the necessary fee.

BEST MODE

Figure 1:
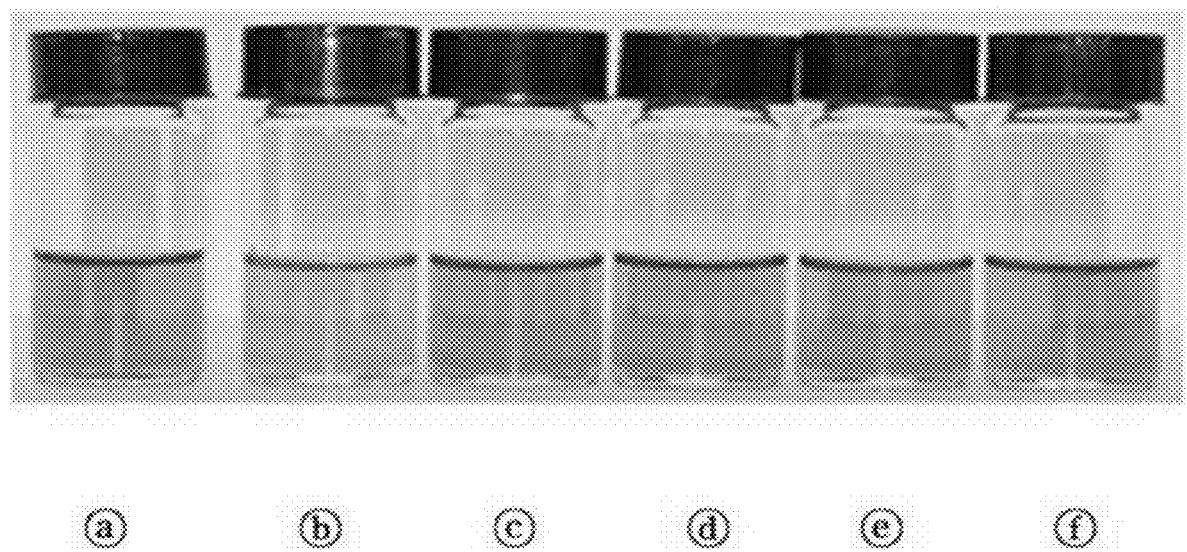
FIG. 1 shows the color change of a ferrocene-based chemical sensor of the present disclosure in response to reaction with various anions.

The present disclosure provides a ferrocene-based compound having high selectivity and superior sensitivity for a specific anion, a chemical sensor (chemosensor) using the same, and a method for preparing the same.

More specifically, the present disclosure provides a ferrocene-based chemical sensor, which is prepared economically by synthesizing a ferrocene-based compound and diluting the same in an organic solvent and allows visual inspection of the color change of an aqueous sulfide ion solution.

The present disclosure provides a ferrocene-based compound represented by Chemical Formula 1 as a chemical sensor having high selectivity and sensitivity for sulfide ion ($S^{2-}$), which is a source of hydrogen sulfide ($H_2S$).

[Chemical Formula 1]

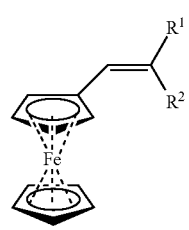

In Chemical Formula 1, each of $R^1$ and $R^2$ is independently an organic compound selected from nitrile (CN), methyl ester ($CO_2Me$) and ethyl ester ($CO_2Et$) and, $R^1$ and $R^2$ may be identical to or different from each other.

The ferrocene-based compound of Chemical Formula 1 can be mass-produced economically and stably using a commercially available ferrocene compound and an organic compound as starting materials. As an example of the method for preparing the ferrocene-based compound of the present disclosure, the ferrocene-based compound may be prepared through a reaction according to Chemical Formula 1. After reacting a ferrocene starting material and an organic compound at an equimolar ratio in a solvent, the final compound is obtained by filtering the produced solid product and removing the solvent under reduced pressure.

[Reaction Scheme 1]

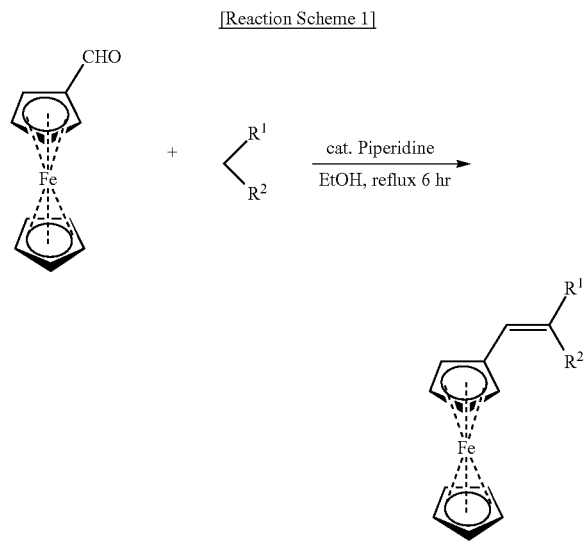

A specific example of the produced final compound is shown in Chemical Formula 2, wherein both the organic compounds ($R^1$, $R^2$) are nitrile (CN).

[Chemical Formula 2]

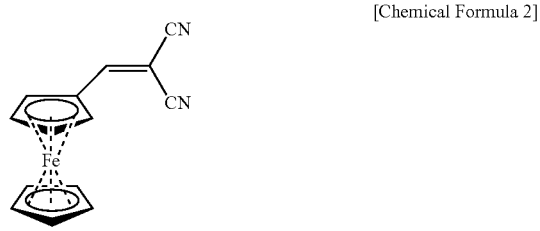

The chemical sensor for detecting sulfide ion may be prepared by dissolving a ferrocene-based compound in an organic solvent. For example, a composition including 0.001-1.00% (w/v) of the compound of Chemical Formula 2 and one or more organic compound selected from saturated or unsaturated hydrocarbons, ethers (including cyclic ethers), esters, alcohols, amines (including cyclic amines), ketones, etc. as the balance may be prepared.

The organic solvent is not limited as long as it can dissolve and does not react with the ferrocene-based compound, and is not specially limited as long as it can dilute the compound of Chemical Formula 2. Examples of the saturated or unsaturated hydrocarbon include aliphatic hydrocarbons such as pentane, hexane, heptane, octane, methene, ethene, propene, butene, pentene, hexene, heptene, octene, methyne, ethyne, propyne, butyne, pentyne, hexyne, heptyne, octyne, etc.; alicyclic hydrocarbons such as cyclopropane, cyclobutane, cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindenecyclohexane, cyclooctane, etc.; aromatic hydrocarbons such as benzene, toluene, xylene, mesitylene, etc.; or mixtures thereof, although not being limited thereto. Examples of the ethers (including cyclic ethers) include tetrahydrofuran, diethyl ether, methyl t-butyl ether or mixtures thereof, although not being limited thereto.

Examples of the esters include methyl acetate, ethyl acetate, butyl acetate, butyl cellosolve acetate, propylene glycol monomethyl ether acetate, diethylene glycol monoethyl ether acetate or mixtures thereof, although not being limited thereto. Examples of the alcohols include methanol, ethanol, propanol, butanol or mixtures thereof, although not being limited thereto. Examples of the amides (including cyclic amides) include N,N-dimethylformamide, N,N-dimethylacetamide, N-methylpyrrolidone or mixtures thereof, although not being limited thereto. Examples of the ketones include acetone, dimethyl ketone, methyl ethyl ketone, diethyl ketone or mixtures thereof, although not being limited thereto.

The present disclosure also provides a hydrogen sulfide detection kit including a ferrocene-based compound which has high selectivity and superior sensitivity for sulfide ion.

Specifically, the detection kit of the present disclosure includes a detection unit which is provided inside an airtight container and composed of paper or fabric to which a ferrocene compound is adsorbed; and a basic reagent which is stored inside or outside the airtight container and generates sulfide ion from hydrogen sulfide. The airtight container is prepared from a material which is stable against chemical substances and may include an opening/closing door or a detection material inlet.

Ferrocene is an early known sandwich compound. It is a transition metal compound with the molecular formula $(C_5H_5)_2Fe$, having two organic rings bound on opposite sides of a central metal atom. Ferrocene is stable at room temperature and can be handled as general chemicals. For example, it has dangerousness comparable to that of acetone and is widely used commercially for digestives, catalysts for manufacturing of plastics such as PE, PP, etc., carbon nanotube materials, etc.

In the hydrogen sulfide detection kit of the present disclosure, the ferrocene compound may be represented by Chemical Formula 1.

[Chemical Formula 1]

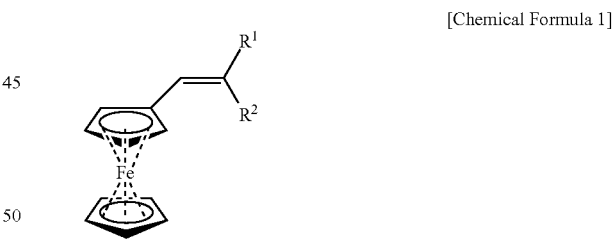

In the above chemical formula, each of $R^1$ and $R^2$ may be independently an organic compound selected from nitrile (CN), methyl ester ($CO_2Me$) and ethyl ester ($CO_2Et$), and $R^1$ and $R^2$ may be identical to or different from each other.

The ferrocene-based compound of Chemical Formula 1 can be mass-produced economically and stably using a commercially available ferrocene compound and an organic compound as starting materials. As an example of the method for preparing the ferrocene-based compound, the ferrocene-based compound may be prepared through a reaction according to Reaction Scheme 1. After reacting a ferrocene starting material and an organic compound at an equimolar ratio in a solvent, the final compound is obtained by filtering the produced solid product and removing the solvent under reduced pressure.

[Reaction Scheme 1]

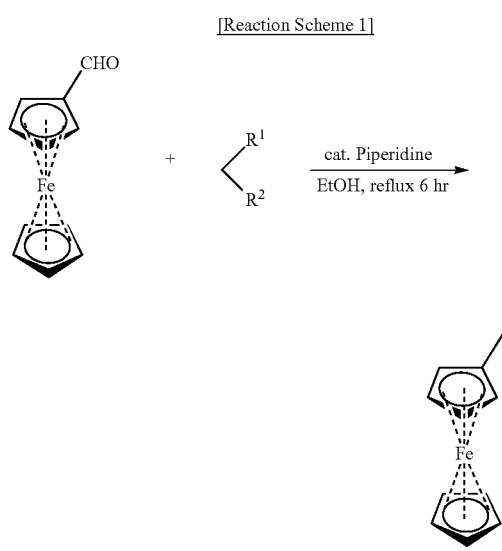

A specific example of the produced final compound is shown in Chemical Formula 2, wherein both the organic compounds ($R^1$, $R^2$) are nitrile (CN).

[Chemical Formula 2]

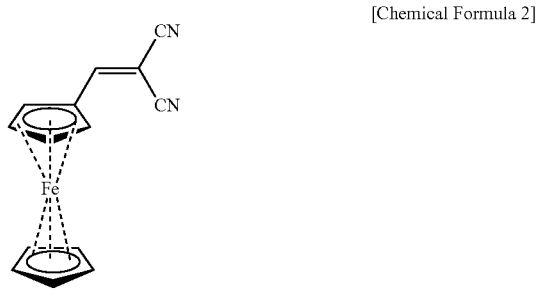

The detection unit of the hydrogen sulfide detection kit may be prepared by dissolving a solid ferrocene-based compound in an organic solvent at room temperature. For example, a composition including 0.001-1.00% (w/v) of the compound of Chemical Formula 2 and one or more organic compound selected from saturated or unsaturated hydrocarbons, ethers (including cyclic ethers), esters, alcohols, amines (including cyclic amines), ketones, etc. as the balance may be adsorbed to paper or fabric, which is a material of the detection unit.

The organic solvent is not limited as long as it can dissolve and does not react with the ferrocene-based compound, and is not specially limited as long as it can dilute the compound of Chemical Formula 2.

The inventors of the present disclosure have identified that the ferrocene-based compound has selectivity for sulfide ion. As shown in FIG. 1, after preparing a 0.05% (w/v) solution by dissolving the compound of Chemical Formula 2 in an ethanol solvent, various aqueous anion solutions were added and color change was observed (ⓐ: before addition of anion, ⓑ: after addition of aqueous sodium sulfide ($Na_2S$) solution, ⓒ: after addition of aqueous sodium fluoride (NaF) solution, ⓓ: after addition of aqueous potassium fluoride (KF) solution, ⓔ: after addition of sodium chloride (NaCl) solution, ⓕ: after addition of aqueous sodium iodide (NaI) solution).

Whereas there was no color change of the chemical sensor solution before and after the addition of the aqueous sodium fluoride, potassium fluoride, sodium chloride or sodium iodide solution, color change occurred immediately (within several seconds) from violet to yellow when the aqueous sodium sulfide ($Na_2S$) solution was added.

In the present disclosure, a basic reagent which generates sulfide ion by reacting with hydrogen sulfide is used together with the ferrocene-based compound described above for detection of hydrogen sulfide. The reagent produces sulfide ion by instantly reacting with hydrogen sulfide in liquid or gas state, and color change occurs when the generated sulfide ion is exposed to the detection unit adsorbed to the ferrocene-based compound owing to a reaction that will be described below. As the basic reagent, any one that can generate sulfide ion by reacting with hydrogen sulfide may be used. For example, one or more selected from LiOH, NaOH, KOH, $Mg(OH)_2$, $Ca(OH)_2$, trimethylamine, triethylamine, pyridine and piperidine may be used in consideration of the chemical stability and safety of handling of the detection kit.

In the present disclosure, the method for detecting hydrogen sulfide uses a hydrogen sulfide detection kit including a detection unit which is provided inside an airtight container and composed of paper or fabric to which a ferrocene compound is adsorbed, and a basic reagent which is stored inside or outside the airtight container and generates sulfide ion from hydrogen sulfide, wherein the basic reagent is coated or introduced into the detection unit, a part of the detection unit is drawn out of the airtight container by partially opening the airtight container and then is exposed to hydrogen sulfide solution or hydrogen sulfide gas, or hydrogen sulfide solution or hydrogen sulfide gas is introduced into the inlet, and the presence of hydrogen sulfide is judged by the color change of the detection unit from violet to yellow.

The mechanism of hydrogen sulfide detection involves the following two-step reaction.

First, in a sulfide ion generation step, sulfide ion is generated as hydrogen sulfide in gas or liquid state reacts with the basic reagent. For example, when sodium hydroxide is used as the reagent, sulfide ion is produced according to the following reaction.

$H_2S + 2NaOH \rightarrow S^{2-} + 2Na^+ + 2H_2O$     [Reaction Scheme 2]

Next, the following reaction proceeds between the generated sulfide ion and the ferrocene compound.

[Reaction Scheme 3]

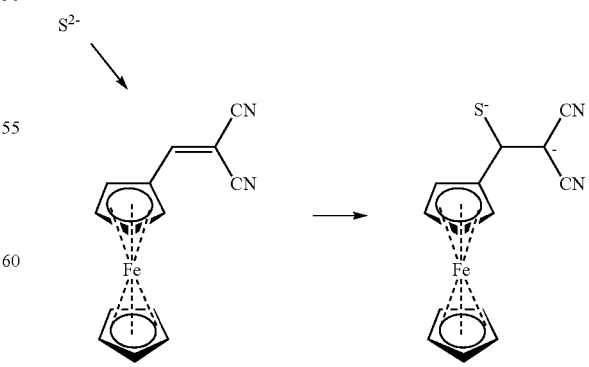

Before the addition of sulfide ion, there exists a double bond between a ferrocenyl group and a dinitrile group of the ferrocene compound. But, when a sulfide ion ($S^{2-}$) is introduced to the ferrocene compound, a single bond is formed between the ferrocenyl group and the dinitrile group. The color of the ferrocene compound is changed as the bonding structure is changed.

A ferrocene-based compound is prepared for a kit for detecting hydrogen sulfide. After adding ferrocene aldehyde and malononitrile at an equimolar ratio as starting materials to an anhydrous ethanol solvent in a reactor, piperidine is added as a catalyst. Then, reaction was terminated after refluxing for 6 hours. After slowly lowering the reactor temperature to room temperature and filtering the produced solid product, the compound of Chemical Formula 2 (1,1-dicyanovinyl-2-ferrocene) was obtained by removing the solvent under reduced pressure. After adding 0.05 g of the prepared ferrocene compound to a 200-mL glass vial, 99.95 mL of ethanol was added. After closing the stopper of the glass vial and dissolving the compound by shaking the vial for 5 minutes, a 0.05% (w/v) detection solution was obtained. The prepared ferrocene compound solution exhibited violet color.

The color change of the ferrocene detection solution in response to hydrogen sulfide gas and hydrogen sulfide solution was tested.

Figure 7A:
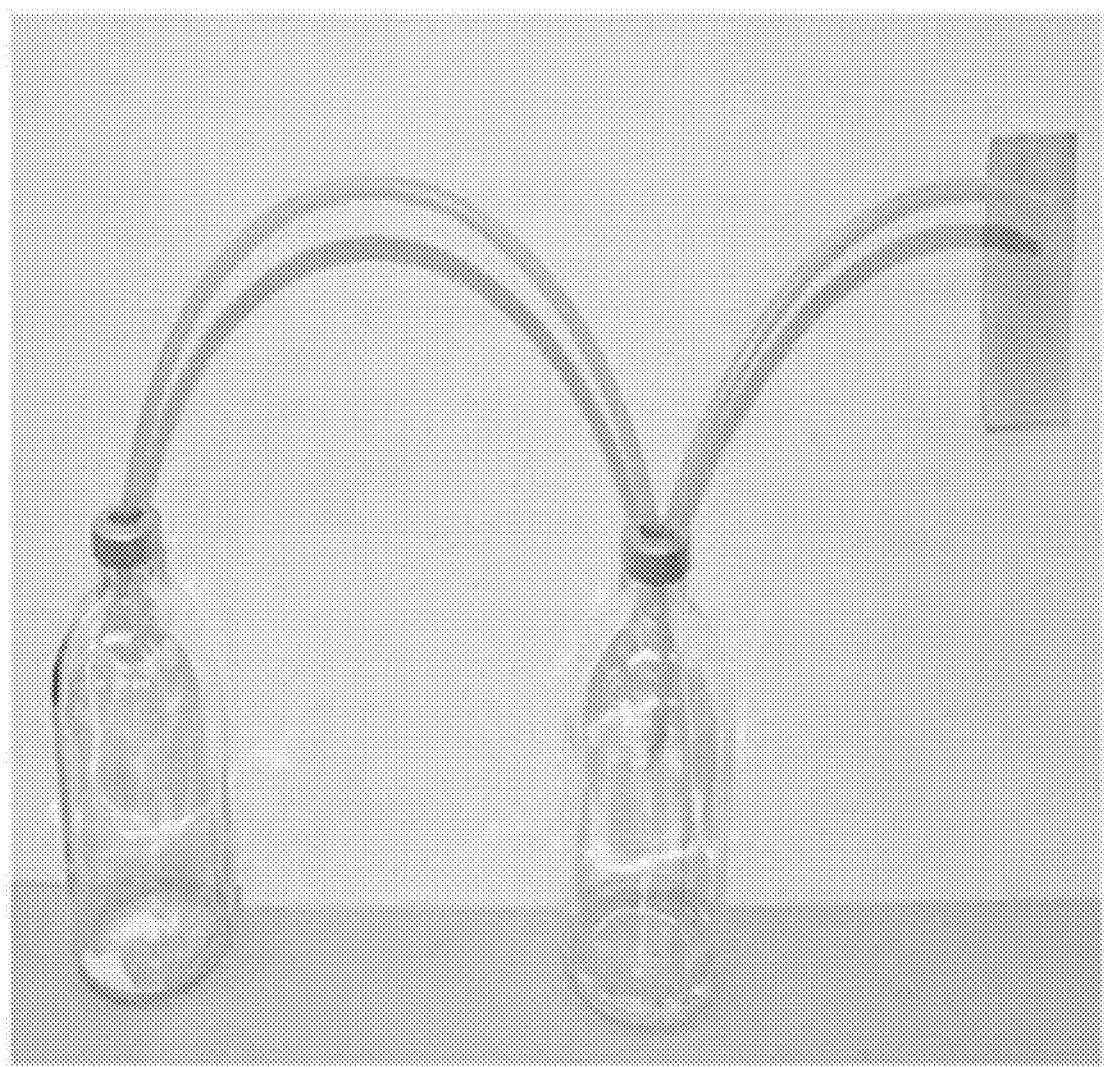
FIGS. 7A and 7B show a detection test for hydrogen sulfide gas.
Figure 7B:

FIGS. 7A and 7B show a detection test for hydrogen sulfide gas. After coating the ferrocene compound on cotton paper and coating a part of the detection unit with sodium hydroxide as a reagent, the kit was exposed to hydrogen sulfide gas. At first, the cotton paper exhibited violet color due to the ferrocene compound (FIG. 7A). When hydrogen sulfide gas collected in a glass bottle was supplied to the cotton paper through a supply tube, the portion coated with sodium hydroxide turned yellow immediately (FIG. 7B).

Figure 8A:
FIGS. 8A and 8B show a detection test for hydrogen sulfide solution.
Figure 8B:

FIGS. 8A and 8B show a detection test for hydrogen sulfide solution. When white cotton paper was twisted, soaked in an acetone solution containing the ferrocene compound and then kept at room temperature, the color of the cotton paper turned violet (FIG. 8A). When the violet cotton paper was dipped in hydrogen sulfide solution after soaking the end portion of the violet cotton paper in sodium hydroxide solution, the end portion of the violet cotton paper turned yellow immediately (FIG. 8B).

Figure 9:
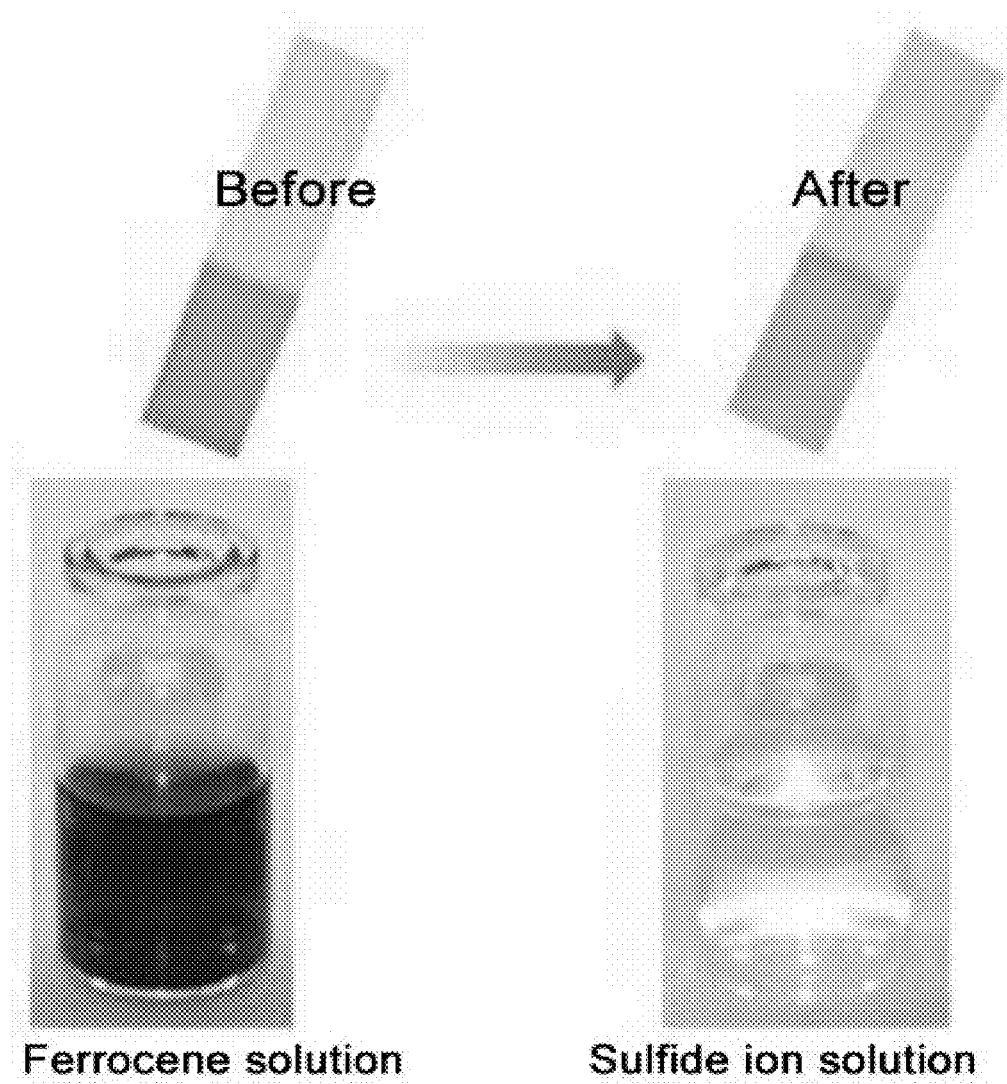
FIG. 9 shows a detection test for sulfide ion solution.

FIG. 9 shows a detection test for sulfide ion solution. When thin paper was soaked in an acetone solution in which the ferrocene compound is dissolved and kept at room temperature, the paper turned violet. When the end portion of the violet paper was dipped in sulfide ion solution, the end portion of the violet paper turned pale yellow immediately.

The hydrogen sulfide detection kit according to the present disclosure, which is equipped with the detection unit including the ferrocene compound, needs to have structure and function which allow easy carrying and provide stability for storage and use.

Figure 10:
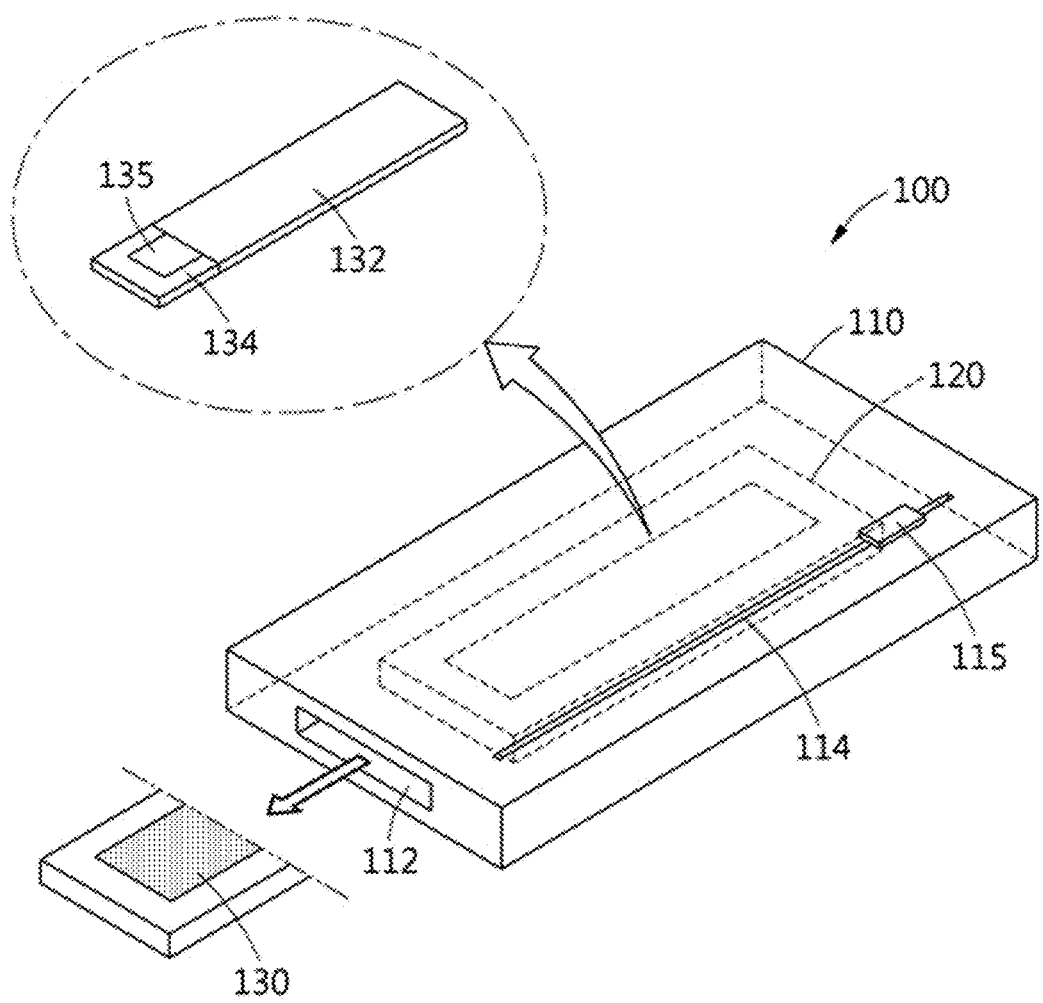
FIG. 10 schematically shows a hydrogen sulfide detection kit according to an exemplary embodiment of the present disclosure.

FIG. 10 schematically shows a hydrogen sulfide detection kit 100 according to an exemplary embodiment of the present disclosure. A detection unit 130 is provided inside an airtight container 110 and an opening/closing door 112 is provided at one side of the container. The detection unit is seated on a moving piece 120 and may be exposed to outside as a guide handle 115 is moved linearly along a guide rail 114.

The detection unit is composed of paper or fabric to which a ferrocene compound 132 is coated, adsorbed or deposited. It is kept inside the airtight container as being integrated and is exposed to outside during detection of hydrogen sulfide only, in order to prevent deformation or contamination of the ferrocene compound during storage. A basic reagent may be stored inside or outside the airtight container. In an exemplary embodiment, the reagent 134 is stored at one side of the detection unit inside the airtight container. For example, the reagent may be stored in a capsule-type container, and the capsule may be broken by pressing a capsule opener 135 so that the reagent may be dropped or coated onto the ferrocene compound of the detection unit. After the reagent is coated on the ferrocene compound, if the detection unit which is partially exposed out of the airtight container is exposed to a material to be detected, sulfide ion is generated from hydrogen sulfide via the two-step reaction described above when hydrogen sulfide is present. Then, color change owing to the reaction between the sulfide ion and the ferrocene compound can be observed directly in real.

Figure 11:
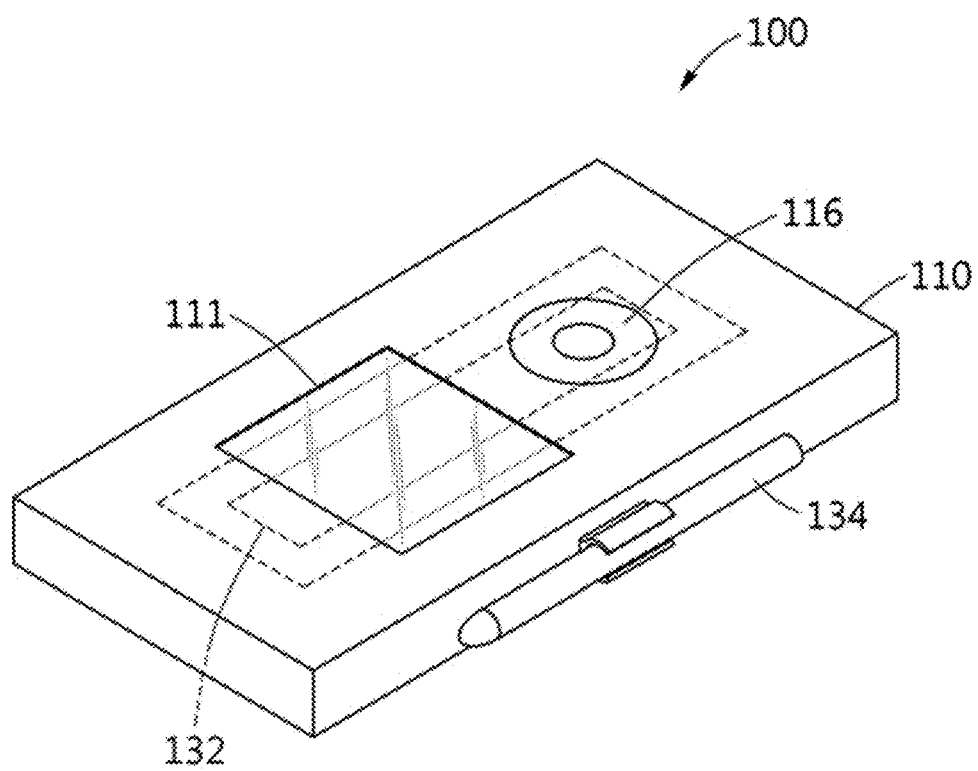
FIG. 11 schematically shows a hydrogen sulfide detection kit according to another exemplary embodiment of the present disclosure.

The reagent may be provided inside the airtight container being spaced apart from the detection unit, without being integrated to the detection unit, or may be kept on the outer surface of the airtight container, and may be coated onto or introduced to the detection unit prior to hydrogen sulfide detection. FIG. 11 schematically shows a hydrogen sulfide detection kit according to another exemplary embodiment of the present disclosure. It can be seen that the reagent 134 is provided at the side surface of the airtight container. The reagent may be introduced to the detection unit through an inlet 116 of the airtight container prior to hydrogen sulfide detection. Then, after supplying a material to be detected through the inlet, color change owing to the reaction with the reagent and the ferrocene compound of the detection unit may be observed. For this, a transparent window 111 for visual inspection may be provided on the surface of the airtight container, and the color change of the detection unit owing to the hydrogen sulfide solution or hydrogen sulfide gas introduced to the detection unit may be observed directly through the transparent window.

According to the present disclosure, a hydrogen sulfide detection kit may be prepared economically by synthesizing a ferrocene-based compound via a simple method of reacting a commercially widely used starting material and diluting the same in an organic solvent. Since the chemical sensor of the present disclosure is capable of detecting sulfide ion in short time within several seconds and with high sensitivity, it can be used in various applications. Particularly, it can prevent the diffusion of hydrogen sulfide at an early stage on the site where spill accident has occurred by detecting sulfide ion at low concentration or high concentration in short time.

Although the specific exemplary embodiments of the present disclosure have been described above, the present disclosure is not limited to the specific exemplary embodiments but may be modified, changed or improved in various forms within the scope of the technical idea of the present disclosure, specifically the scope defined by the appended claims.

EXAMPLE a) Preparation of Ferrocene-Based Compound

First, a ferrocene-based compound represented by Chemical Formula 2 was prepared as a chemical sensor for detecting sulfide ion.

After adding ferrocene aldehyde and malononitrile at an equimolar ratio as starting materials to an anhydrous ethanol solvent in a reactor, piperidine was added as a catalyst. Then, reaction was terminated after refluxing for 6 hours. After slowly lowering the reactor temperature to room temperature and filtering the produced solid product, the compound of Chemical Formula 2 (1,1-dicyanovinyl-2-ferrocene) was obtained by removing the solvent under reduced pressure.

b) Chemical Sensor Solution for Detecting Sulfide Ion

After adding 0.05 g of the prepared ferrocene compound to a 200-mL glass vial, 99.95 mL of ethanol was added. After closing the stopper of the glass vial and dissolving the compound by shaking the vial for 5 minutes, a 0.05% (w/v) detection solution was obtained. The prepared ferrocene compound solution exhibited violet color.

c) Detection of Sulfide Ion Using Chemical Sensor Solution

After adding 15.6 mg of sodium sulfide ($Na_2S$) to a 100-mL flask, a 64 ppm aqueous sulfide ion solution was prepared by filling distilled water up to the mark. After transferring 10 mL of the solution to a 100-mL flask, a 6.4 ppm aqueous sulfide ion solution was prepared by filling distilled water up to the mark.

After adding 3 mL of the prepared chemical sensor solution to a 10-mL glass vial and adding 3 mL of the 6.4 ppm aqueous sulfide ion solution, the stopper of the glass vial was closed and the vial was shaken with hands for 1 minute. The color of the solution was changed from violet to yellow.

Test of Selectivity for Sulfide Ion

FIG. 1 shows the color change of the 0.05% (w/v) solution prepared by dissolving the compound of Chemical Formula 2 in an ethanol solvent when added to various aqueous anion solutions (ⓐ: before addition of anion, ⓑ: after addition of aqueous sodium sulfide ($Na_2S$) solution, ⓒ: after addition of aqueous sodium fluoride (NaF) solution, ⓓ: after addition of aqueous potassium fluoride (KF) solution, ⓔ: after addition of sodium chloride (NaCl) solution, ⓕ: after addition of aqueous sodium iodide (NaI) solution).

Whereas there was no color change of the chemical sensor solution before and after the addition of the aqueous sodium fluoride, potassium fluoride, sodium chloride or sodium iodide solution, color change occurred immediately (within several seconds) from violet to yellow when the aqueous sodium sulfide ($Na_2S$) solution was added. From this result, it can be seen that the chemical sensor of the present disclosure has selective responsivity to sulfide ion.

Mechanism of Color Change in Response to Sulfide Ion

The mechanism of color change occurring when the aqueous sulfide ion solution is added to the chemical sensor solution of the present disclosure can be explained as follows.

Figure 2:
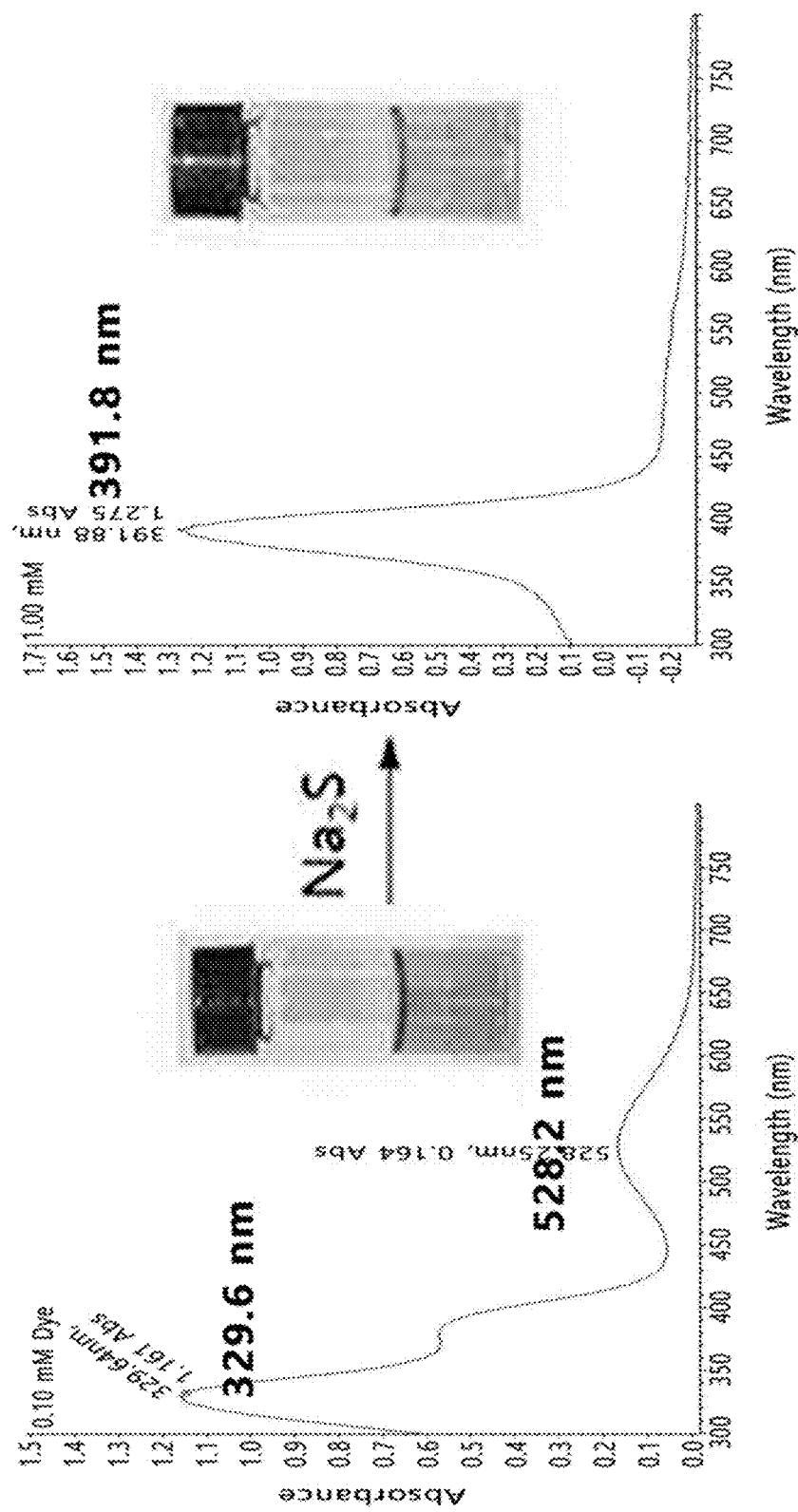
FIG. 2 shows the change in the UV-Vis spectrum of a chemical sensor.

FIG. 2 shows the UV-Vis spectra of the chemical sensor solution of the present disclosure before and after addition of sulfide ion. Absorption peaks were observed at 329.6 nm and 528.2 nm in the UV-Vis region before sulfide ion was added (left), and a single absorption peak was observed at 391.8 nm after sulfide ion was added (right).

Figure 3A:
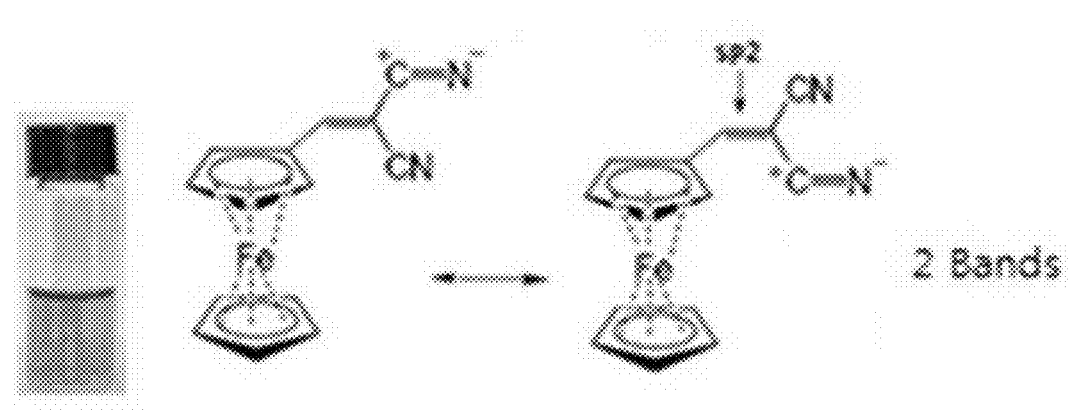
FIGS. 3A and 3B show chemical formulas and UV-Vis spectrum peaks before introduction of sulfide ion.
Figure 3B:
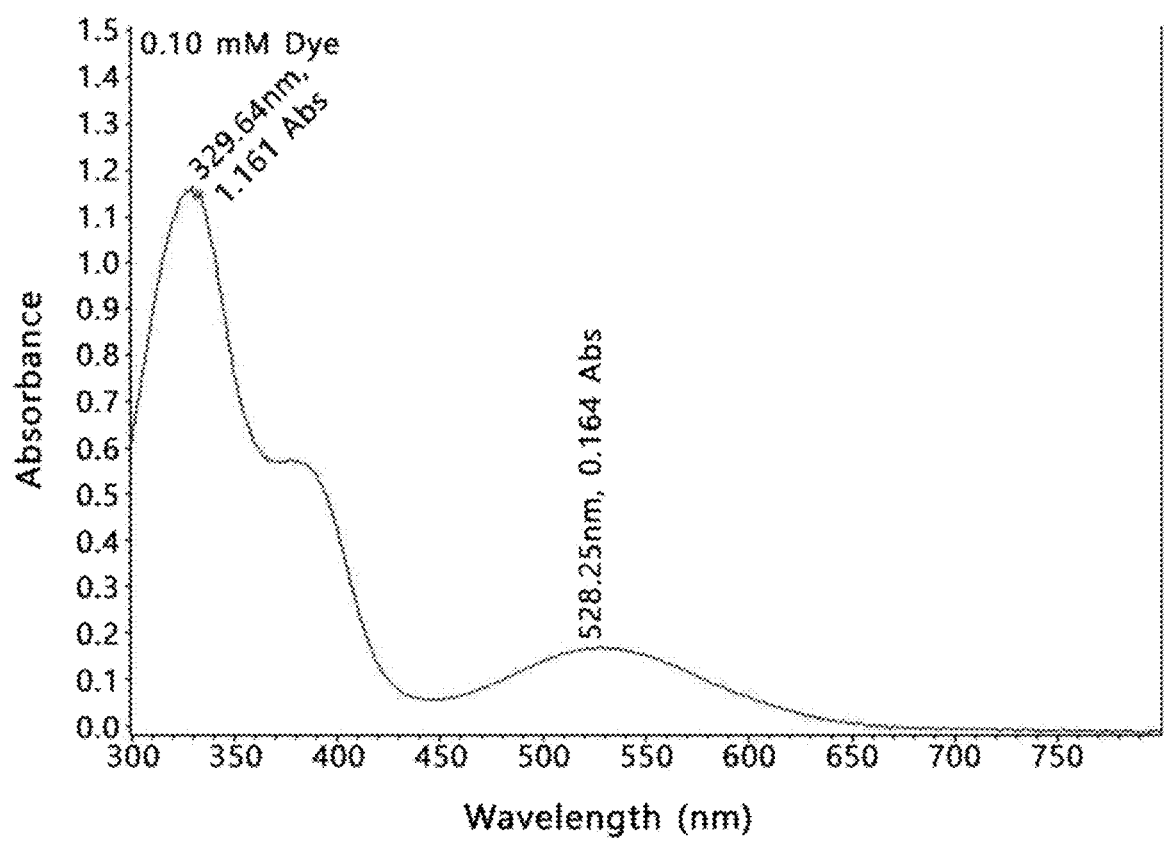

The two peaks observed before the addition of sulfide ion is attributed to the system wherein a π orbital function is conjugated by a double bond between the ferrocenyl group and the dinitrile group of the compound of Chemical Formula 2 as shown in FIG. 3A. The double bond between the ferrocenyl group and the dinitrile group lies on a plane as a $sp^2$ hybrid orbital function, and two peaks are observed because free rotation is impossible (FIG. 3B).

Figure 4A:
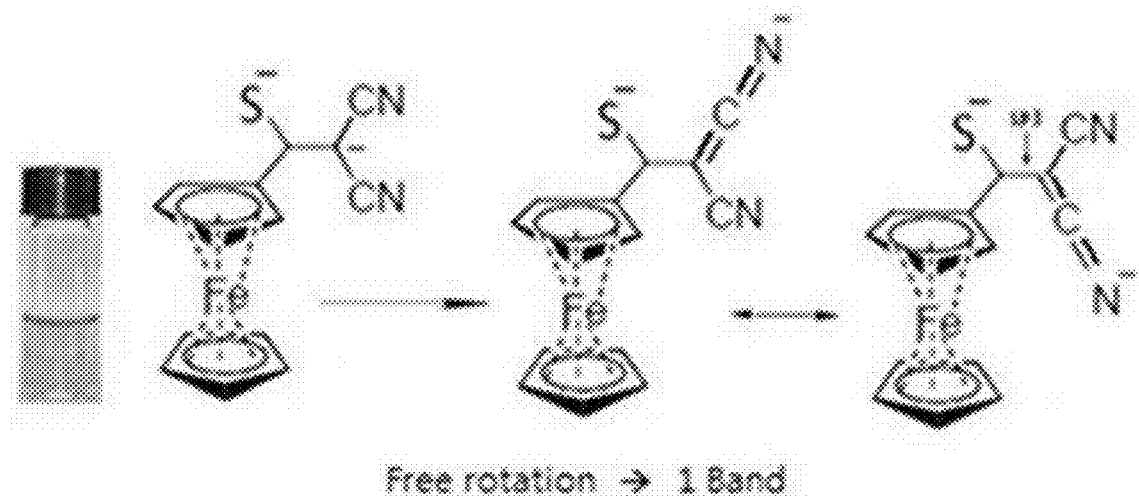
FIGS. 4A and 4B show chemical formulas and UV-Vis spectrum peaks after introduction of sulfide ion.
Figure 4B:
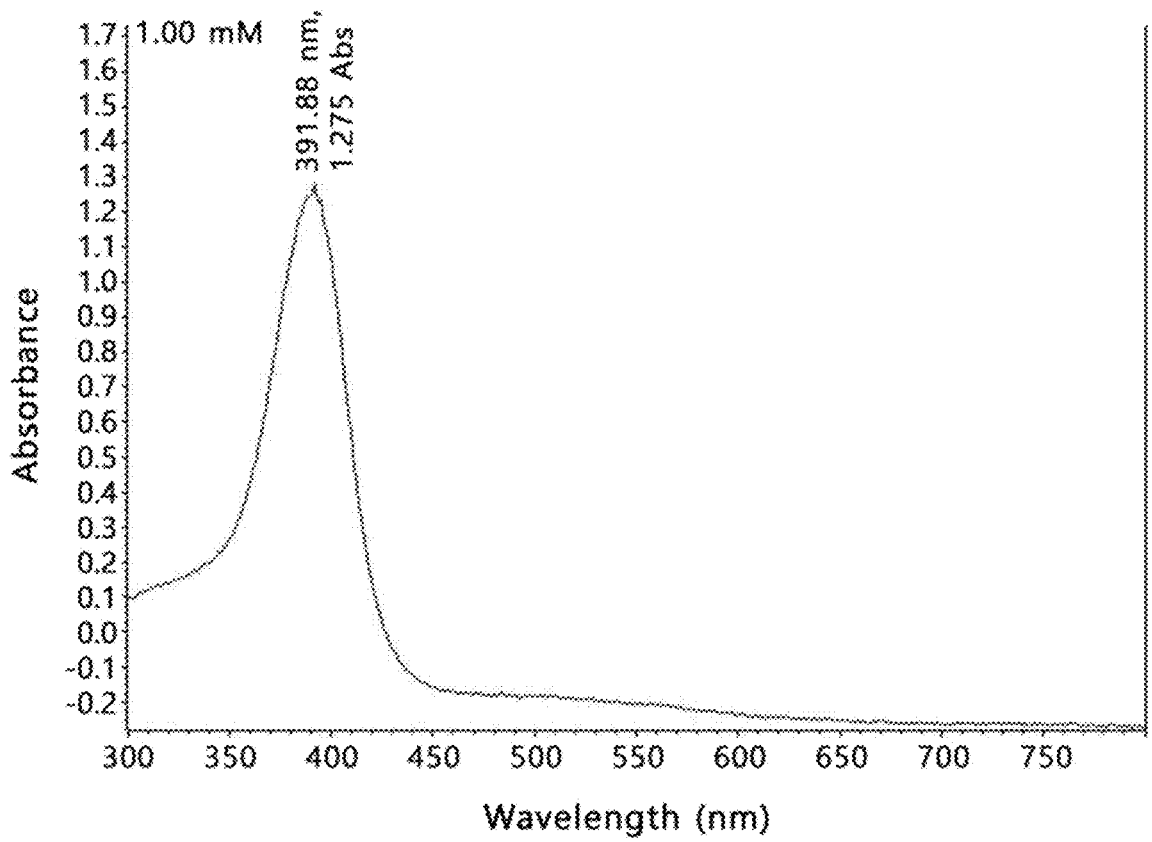

In contrast, as shown in FIG. 4A, when sulfide ion ($S^{2-}$) is introduced to the double bond between the ferrocenyl group and the dinitrile group of the ferrocene-based compound of the present disclosure represented by Chemical Formula 2, a single bond is formed between the ferrocenyl group and the dinitrile group, and a single peak is observed since the $sp^3$ hybrid orbital function of the single bond allows free rotation (FIG. 4B). In addition, the electrons produced as the sulfide ion ($S^{2-}$) is introduced are strongly drawn by the two nitrile groups which are strong electron acceptors.

Test of Sensitivity for Sulfide Ion

In order to investigate the sensitivity for sulfide ion, sensitivity was tested by varying the concentration of sulfide ion.

Figure 5:
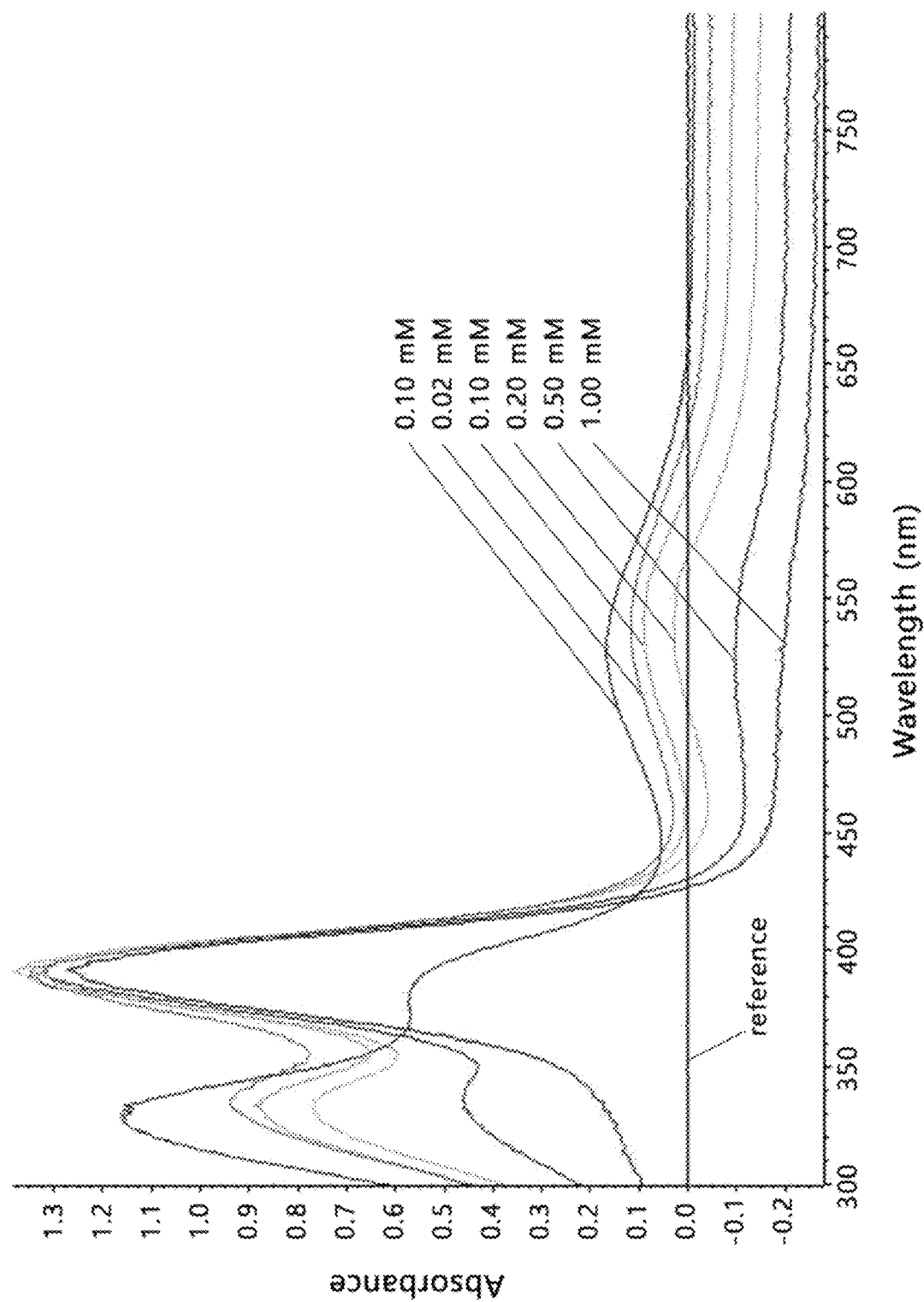
FIG. 5 shows the change in the absorption wavelength of the UV-Vis spectrum of a chemical sensor depending on the concentration of sulfide ion.
Figure 6:
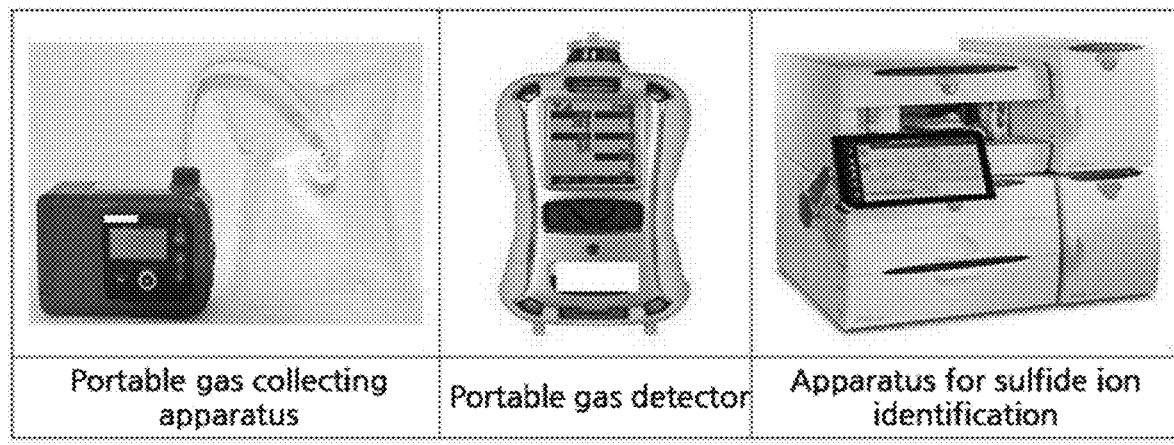
FIG. 6 shows the existing apparatuses for gas analysis and sulfide ion identification.

After adding aqueous sodium sulfide ($Na_2S$) solutions of different concentrations to a 0.05% (w/v) solution of the chemical sensor of Chemical Formula 2 dissolved in an ethanol solvent, the change in the UV-Vis spectrum was observed. FIG. 5 shows the change in the UV-Vis spectrum depending on sulfide ion concentration.

As the concentration of the aqueous sodium sulfide ($Na_2S$) solution was increased from 1.28 ppm to 64 ppm, the intensities of the absorption peaks at 329.6 nm and 528.2 nm were decreased and, at the same time, a single absorption peak was observed at 391.8 nm. In particular, the 1.28 ppm aqueous sodium sulfide ($Na_2S$) solution showed rapid decrease in the intensities of the absorption peaks at 329.6 nm and 528.2 nm even at low concentrations. This result shows that the chemical sensor of the present disclosure exhibits very high sensitivity even at a low concentration of sulfide ion.

A chemical sensor using the ferrocene-based compound of the present disclosure and detection of sulfide ion using the same allow fast and accurate detection of sulfide ion with high sensitivity without requiring the complicated pretreatment of a sample containing sulfide ion, special chemical reaction conditions, expensive analytical instruments, etc.

In particular, the presence of sulfide ion which is a source of hydrogen sulfide can be confirmed visually in real time through color change, and detection can be made in short time with high sensitivity without being affected by environmental factors such as temperature and humidity. Accordingly, sulfide ion can be detected in real time at accident site, and the present disclosure can be actively utilized for detection of aqueous hydrogen sulfide solution on site.

Although the present disclosure has been described with specific exemplary embodiments, the present disclosure is not limited to the specific exemplary embodiments and they may be modified, changed or improved variously within the technical scope presented in the present disclosure, specifically the scope defined in the appended claims.

DETAILED DESCRIPTION OF MAIN ELEMENTS

| | |
|---|---|
| 100: detection kit | 110: airtight container |
| 111: transparent window | 112: opening/closing door |
| 114: guide rail | 115: guide handle |
| 116: inlet | 120: detection unit moving piece |
| 130: detection unit | 132: ferrocene compound |
| 134: reagent | 135: capsule opener |

The invention claimed is:

1. A sulfide ion-selective chemical sensor comprising a ferrocene-based compound represented by Chemical Formula 1 and showing color change by selectively reacting with sulfide ion:

[Chemical Formula 1]

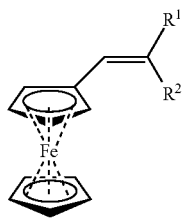

wherein
each of $R^1$ and $R^2$ is independently an organic compound selected from nitrile (CN), methyl ester ($CO_2Me$) and ethyl ester ($CO_2Et$) and, $R^1$ and $R^2$ may be identical to or different from each other.

2. The chemical sensor according to claim 1, wherein, in the compound represented by Chemical Formula 1, both $R^1$ and $R^2$ are nitrile (CN).

3. The chemical sensor according to claim 1, wherein 0.001-1.00% (w/v) of the compound represented by Chemical Formula 1 is dissolved in one or more organic solvent selected from saturated or unsaturated hydrocarbons, ethers, esters, alcohols, amines and ketones.

4. A hydrogen sulfide detection kit comprising:
an airtight container comprising an opening/closing door and a detection material inlet;
a detection unit which is provided inside the airtight container and composed of paper or fabric to which a ferrocene compound is adsorbed; and
a basic reagent which is stored inside or outside the airtight container and generates sulfide ion from hydrogen sulfide,
wherein the ferrocene compound is represented by Chemical Formula 1:

[Chemical Formula 1]

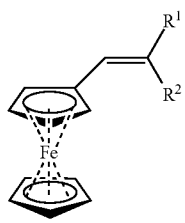

wherein each of $R^1$ and $R^2$ is independently an organic compound selected from nitrile (CN), methyl ester ($CO_2Me$) and ethyl ester ($CO_2Et$).

5. The hydrogen sulfide detection kit according to claim 4, wherein the basic reagent which generates sulfide ion by reacting with hydrogen sulfide is any one selected from LiOH, NaOH, KOH, $Mg(OH)_2$, $Ca(OH)_2$, trimethylamine, triethylamine, pyridine and piperidine.

6. The hydrogen sulfide detection kit according to claim 4, which is equipped with a transparent window on the surface of the airtight container, which allows the inspection of the color change of the detection unit due to hydrogen sulfide solution introduced to the detection unit or hydrogen sulfide gas exposed to the detection unit.

7. The hydrogen sulfide detection kit according to claim 4, wherein the basic reagent is stored in a capsule-type container provided at one side of the detection unit and is dropped or coated onto the ferrocene compound of the detection unit as the capsule is broken.

8. The hydrogen sulfide detection kit according to claim 4, wherein the basic reagent is provided inside the airtight container as being spaced apart from the detection unit or is stored on the outer surface of the airtight container, and the reagent is coated or introduced to the detection unit during detection of hydrogen sulfide.

9. A method for detecting hydrogen sulfide using a detection kit comprising an airtight container comprising an opening/closing door and a detection material inlet, a detection unit which is provided inside the airtight container and composed of paper or fabric to which a ferrocene compound is adsorbed, and a basic reagent which generates sulfide ion from hydrogen sulfide, wherein the ferrocene compound is represented by Chemical Formula 1:

[Chemical Formula 1]

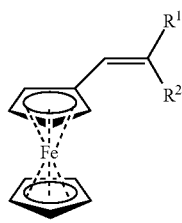

wherein each of $R^1$ and $R^2$ is independently an organic compound selected from nitrile (CN), methyl ester ($CO_2Me$) and ethyl ester ($CO_2Et$),
wherein
the basic reagent is coated or introduced into the detection unit,
a part of the detection unit is drawn out of the airtight container by partially opening the airtight container and then is exposed to hydrogen sulfide solution or hydrogen sulfide gas, or hydrogen sulfide solution or hydrogen sulfide gas is introduced into the inlet, and
the presence of hydrogen sulfide is judged by the color change of the detection unit from violet to yellow.

* * * * *